June 4, 1935.  P. J. TOEWS  2,003,617

DOUGH DIVIDER FOR DOUGHNUT MACHINES AND THE LIKE

Filed April 6, 1932

INVENTOR.
PETER J. TOEWS.
BY
ATTORNEY.

Patented June 4, 1935

2,003,617

UNITED STATES PATENT OFFICE 2,003,617

DOUGH DIVIDER FOR DOUGHNUT MACHINES AND THE LIKE

Peter J. Toews, Minneapolis, Minn., assignor to National Automatic Doughnut Machine Company, Minneapolis, Minn., a corporation of Minnesota Application April 6, 1932, Serial No. 603,502

3 Claims. (Cl. 107—14)

My invention relates to a dough divider for doughnut machines and the like, and has for its object the provision of a novel form of spout or discharge device for the dough tank of a doughnut machine, whereby a plurality of evenly sized dough discharges may be simultaneously made from the same tank.

One object of my invention lies in the provision of a multiple divider device so connected with the dough tank that the dough discharged therefrom is first divided into two equal passages and then each of these equal passages are again divided into two equal passages providing for the discharge of four equal sized dough rings.

Another object of my invention lies in the provision of a novel securing and retaining means for a dough tank with respect to the discharge portion thereof.

Other objects and advantages in details of construction will be apparent as the description proceeds, reference now being had to the figures of the accompanying drawing forming a part of this application and wherein like reference numerals indicate like parts.

Figures 1, 2, 3:
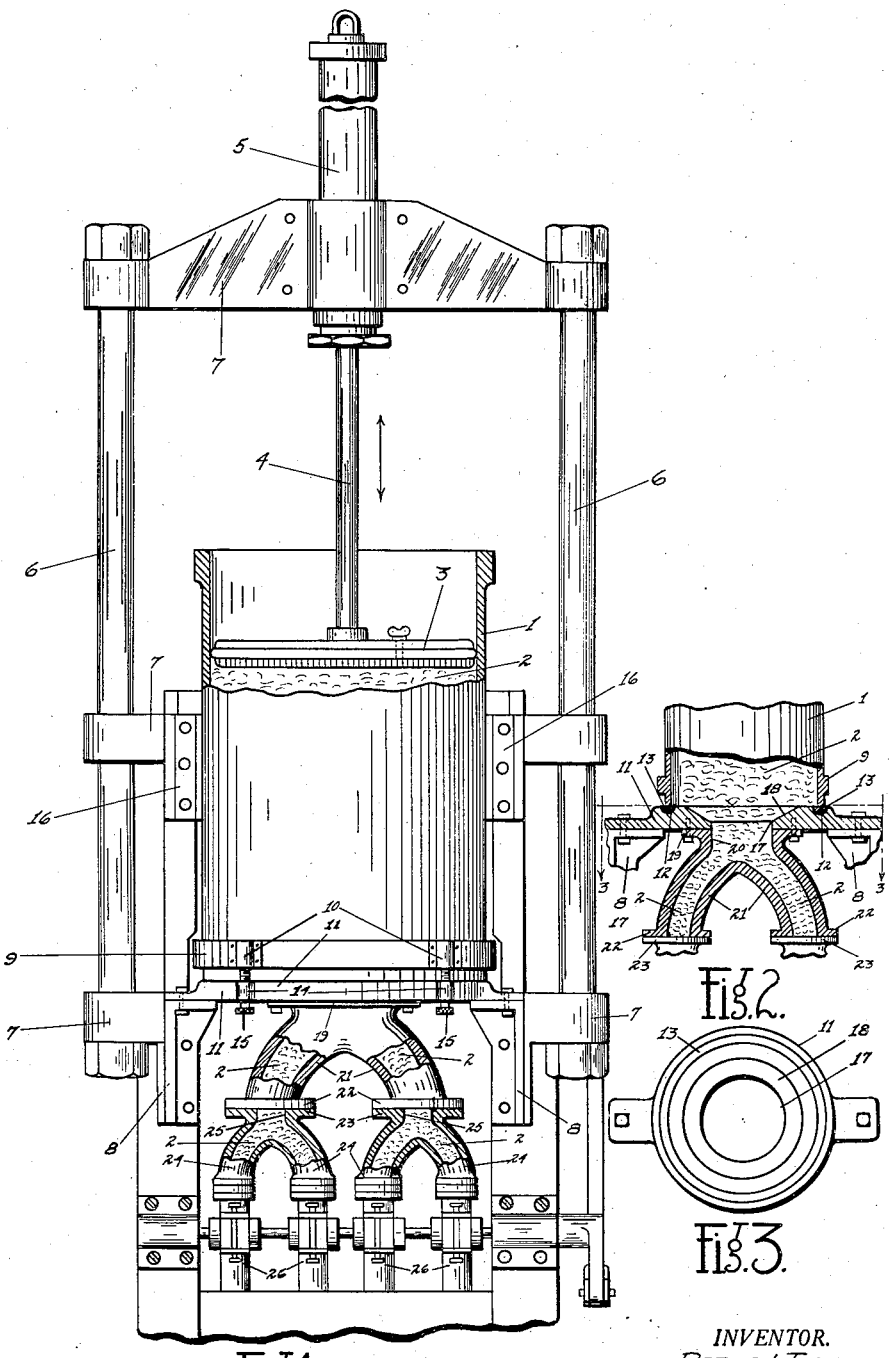
Figure 1 is a side view of my invention in operative relation with a dough tank, certain parts being broken away for clearness of illustration.
Figure 2 is a detail cross sectional view illustrating the connection between the dough tank and the dividing device.
Figure 3 is a detail view taken on the line 3—3 of Figure 2 with the tank removed.

In doughnut machines and the like there is usually provided a tank or receptacle for the mass of dough and from which tank the dough is discharged through suitable cutters operable periodically to drop dough rings into the hot grease for cooking the dough. In order that the output of such a machine can be increased, several means have been provided for dividing the discharge of dough from the tank in order that a plurality of such discharges might be made simultaneously. Such means have included providing a plurality of orifices or openings in the bottom of the tank, with the passages to the cutters leading therefrom. Such means have not proven satisfactory, however, for many reasons including inequality of feeding the dough through the openings, expensive apparatus, difficult assembly, etc.

By my invention I have provided a simple dough dividing means whereby four equal discharge passages for the dough are provided in such a manner that equal pressure is applied through all of them whereby uniform dough discharges can be made. My invention is simple and economical in construction, of few parts, and easily assembled.

The reference character 1 refers generally to the dough tank which is filled with the dough 2 adapted to be forced downwardly through the tank under the pressure of the ram 3 provided with a piston rod 4 suitably controlled in the cylinder 5, by air, liquid or other pressure means. The tank and cylinder 5 may be supported by the frame work comprising the rods 6 and the cross braces 7. Secured to the lower brace 7 are a pair of brackets 8 for a purpose to be described.

The tank 1 is open at both ends and is provided adjacent its lower end and around its outer periphery with a rim 9 upon which are mounted threaded sockets 10 for a purpose to be described.

Suitably secured upon the brackets 8 is a plate 11 provided on its upper surface with a circular groove 12 within which may be placed a rubber or other soft material ring or gasket 13 upon which is adapted to fit the lower end of the tank 1. Threaded lugs 14 are provided on the plate 11 and through these extend the threaded pins 15 into the threaded sockets 10 on the ring 9 of the tank. Obviously tightening the pins in the position shown in Figure 1 serves to provide a tight leak proof connection between the lower end of the tank 1 and the plate 11. Obviously, the tank can be removed by removing such pins 15 whereupon the tank may be lifted upwardly and out of the frame for cleaning. Suitable guides or steadying support brackets 16 are provided on frame rods 6 for engagement with the tank intermediate its ends.

The plate 11 is provided with an opening 17 centrally thereof communicating with the tank 1. The material of the plate 11, adjacent such opening 17, is dished or inclined downwardly as at 18 to serve as a guide or hopper for the dough as it is pressed downwardly through the tank and into the restricted opening 17 in the plate 11.

Suitably secured to the underside of the plate 11 is a flanged plate 19 provided with an opening 20 in registry with the opening 17. This plate 19 is provided with downwardly extending hollow extensions 21, the lower ends of which are spaced apart, whereby the dough 2 forced downwardly from the tank 1 through the openings 17 and 20 is equally divided and forced under pressure through the hollow divider extensions 21.

The lower ends of the extensions 21 are flanged as at 22 and suitably secured to each of the flanges 22 are the upper flanged ends 23 of secondary divider means comprising the hollow extensions 24. The flanged upper ends 23 of these secondary dividers are apertured as at 25 and communicate with the lower open ends of the extensions 21.

Obviously the dough forced through the extensions 21 as above explained, from the tank 1, is further divided at the outlet of each extension and forced under equal pressure through the four extensions 24 and into the cutting and dropping devices 26 which may be of any desired or suitable character and the details of which form no part of this invention.

It will thus be seen that I have provided a dividing means for dough for use in a doughnut machine by means of which the simultaneous ejecting of dough rings is made possible in multiple groups instead of one or two as heretofore provided, and with the feeding means operative to force the dough under pressure out of the tank through a single opening, thus insuring a uniform pressure on the dough through the various divisions and passages through which it passes to the extrusion points.

Of course, changes may be made in details of construction and arrangement of parts without departing from the spirit and scope of my invention. I do not limit myself, therefore, to the exact form herein shown and described other than by the appended claims.

I claim:

1. In combination, a dough tank having a single central discharge opening at the lower end thereof, means for forcing dough downwardly in said tank and through said opening, a divider having a pair of passageways communicating with said opening, said passageways being symmetrical with respect to said opening and terminating in outlets spaced from one another, and secondary dividers having passageways communicating with the outlets of said first named divider, the passageways of said second named dividers being symmetrical with respect to said outlets and terminating in secondary outlets, the spacing of said secondary outlets being one-half that of said first named outlets.

2. In combination, a dough tank having a single discharge opening at the lower end thereof, means for forcing dough downwardly in said tank and through said opening, a divider having a pair of passageways communicating with said opening and terminating in outlets, and secondary dividers having passageways communicating with the outlets of said first named divider and each terminating in a plurality of secondary outlets, all of said secondary outlets from both of the secondary dividers being arranged in a single common plane.

3. In combination, a dough tank having a single discharge opening at the lower end thereof, means for forcing dough downwardly in said tank and through said opening, a divider having a pair of passageways communicating with said opening and terminating in outlets spaced from one another and two secondary dividers, each having two passageways communicating with the outlets of said first named divider and terminating in secondary outlets, the spacing of the secondary outlets of each secondary divider being substantially equal to one-half the spacing of the first named outlets.

PETER J. TOEWS.